INVENTORS
FREELAND R. GOLDAMMER
ROY E. KANITZ
BY Frank A. Seeman
ATTORNEY

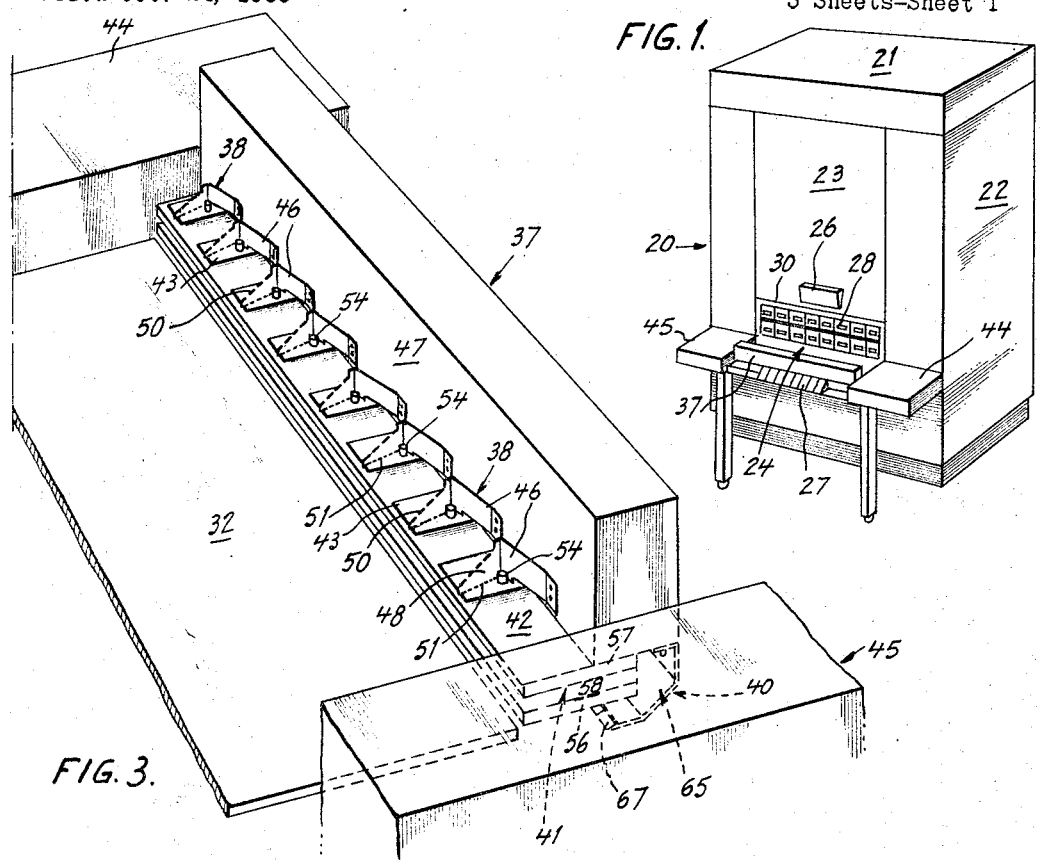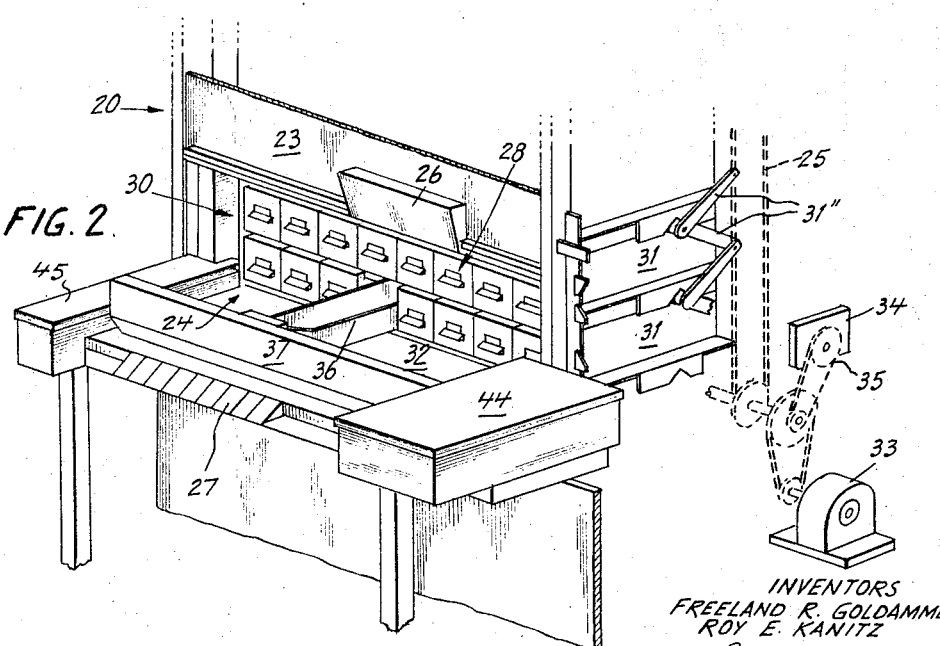

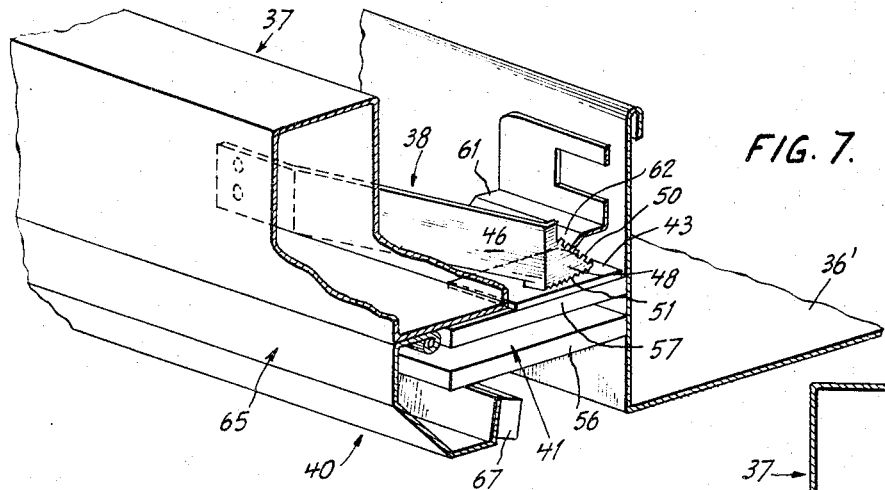
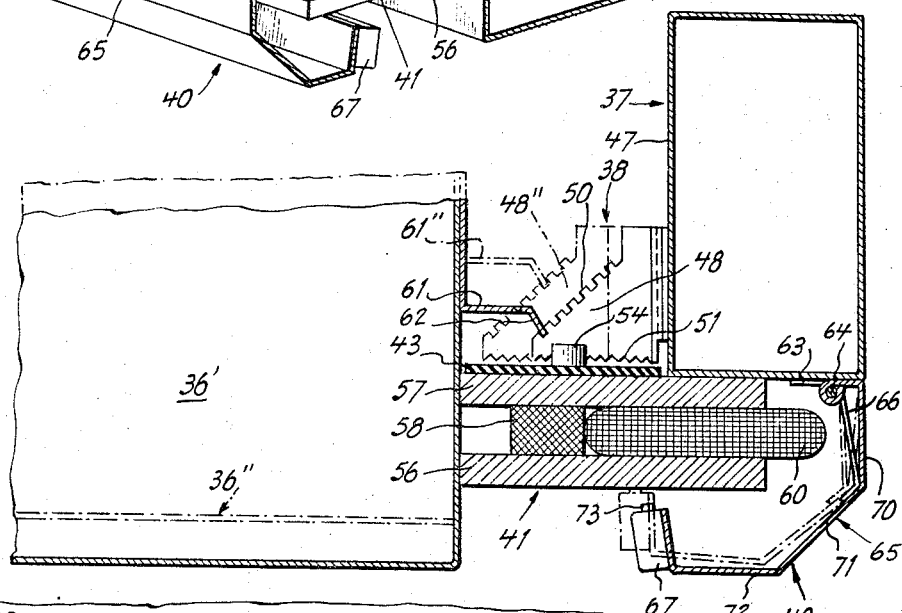
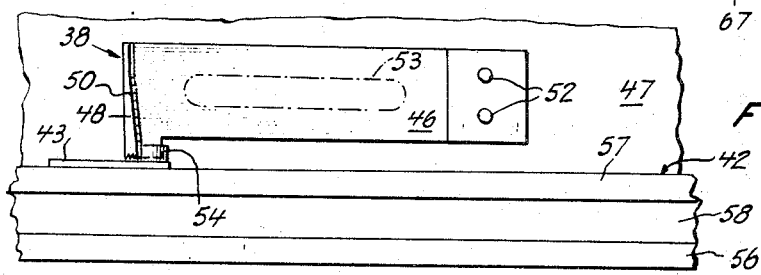
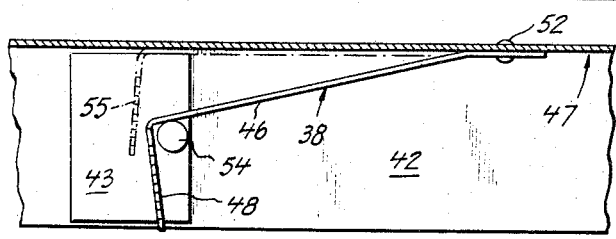

United States Patent Office 3,345,117
Patented Oct. 3, 1967

3,345,117
ARTICLE STORAGE APPARATUS
Freeland R. Goldammer and Roy E. Kanitz, Williamsville,
N.Y., assignors to Sperry Rand Corporation, New York,
N.Y., a corporation of Delaware
Filed Oct. 24, 1966, Ser. No. 589,023
11 Claims. (Cl. 312—223)

The present invention relates to article storage apparatus and more particularly to improved means for extracting an article or article carrying container from a support member and for restoring the article or container to the support member.

In some present day article supporting or storage apparatus, as for example, certain mechanized file units having a plurality of carriers mounted on a conveyor, it is well known to arrange containers, such as card trays, in side-by-side relationship on the supporting surface of each carrier. An operator, through operation of the conveyor, brings a selected carrier to a stop position at a work station arranged adjacent an access opening in the file unit. Conveyor operation is usually controlled by the operator via an externally located push button type control panel. In such apparatus it is not uncommon to employ the same panel to control the operation of an extraction mechanism adapted to automatically withdraw a selected article carrying container from a selected carrier resting adjacent the work station. Upon termination of the need for access to the withdrawn article carrying container or upon desire to gain access to a different container, the controls are then utilized to initiate operation of the extraction mechanism for automatic restoration of the withdrawn container to the stopped carrier. A mechanized file unit of the nature described above, having an extraction mechanism for automatically withdrawing and restoring card trays or the like from a carrier and having circuit means for controlling the operation thereof, is described in U.S. Patent No. 3,235,319 issued Feb. 15, 1966, and entitled, "Article Storage Equipment."

In certain instances it has been found that it is desirable in mechanized file units employing automatic extraction mechanisms to provide features that assure the operator's safety and comfort by, inter alia, avoiding unnecessary noise and shifting of the tray during translation and/or access thereto. For example, when energization for the automatic extractor is interrupted during operation for the safety of the operator, or when the energization is turned off upon arrival of the selected tray to its withdrawn position, it is advantageous to retain the tray in the position in which it was disposed when the deenergization occurred. By providing for such tray retention during a safety shut down, resumption of extractor operation may be carried out in an expeditious manner without requiring the need for manual operator intervention. Further, it has been learned that tray retention provides for a smooth extraction operation and obviates physical jarring of the tray and the contents thereof.

File units constructed to operate in the foregoing manner may be provided with various known safety devices to prevent accidental operation of the conveyor, especially when the operator reaches within the access opening of the unit; however, a further need for operator safety arises when automatic tray extractor's are utilized. This need is prevalent in devices having operator work stations through which trays are automatically moved, as in the exemplary unit disclosed in the patent referred to hereinabove. For example, if the operator's hand or another object is resting in the path of the extractor mechanism during tray translation protective devices associated with the access opening would be ineffective to stop traversal of the extractor mechanism. Assuming such safety device can be provided, upon reactivation of the extractor mechanism after removal of such obstruction it is advantageous to be assured that the extractor and selected tray have remained engaged to obviate the necessity of manual intervention by the operator to physically adjust the selected tray for completion of the partially completed extraction operation.

In other instances in which mechanized file units of the foregoing nature are employed, problems have been encountered as a direct result of physical displacement of the tray with respect to the face of the extractor mechanism. This problem is especially prevalent when the card trays are heavy and/or loaded with a full complement of material, such as index cards. The weight of the tray and its contents causes a jarring thereof when such shifting takes place and the tray engages associated stop means. The mentioned engagement also results in an objectionable noise if the tray shifts an appreciable distance. The shift is due to unavoidable tolerances in the conveyor systems involved, thereby causing the rest position at which the carriers are disposed adjacent the access opening to vary slightly from one selection to the next. For example, when the conveyor initially moves in one direction, slack is taken up in one relationship with the opening while operation of the conveyor in the opposite direction results in slack being taken up in the corresponding opposite direction. As disclosed in U.S. Patent No. 3,235,319 (mentioned hereinabove) the small variation in the rest disposition of the carrier does not effect the general extractor operation. When a selected tray is being removed from the carrier resting on the access opening, the extractor assembly remains slidably coupled to the tray during a vertical tray shift as the center of gravity passes over the edge of the carrier. The magnitude and effects of the relative position shift varies in degree in accordance with several factors, e.g., conveyor design tolerances, distance of conveyor travel from the preceeding rest position thereof, size and loading characteristics of the selected tray, strength of the coupling means, etc.

It is an object of this invention to provide article storage apparatus which includes novel means for withdrawing an article from a support member.

Another object is to provide article storage apparatus which includes novel means for withdrawing an article or an article carrying container from a support member and which means is adapted to return the article or container to the support member.

A further object is to provide article storage apparatus including novel article handling means for withdrawing an article from and/or restoring an article to a support member and which article handling means includes means for assuring desirable article attitude during translation thereof.

Still another object is to provide article storage apparatus including novel article handling means for translating an article and/or an article container between a support member and a work station and which article handling means includes means for preventing objectionable noise and/or shifting of the article or container during translation thereof.

Yet another object is to provide novel article handling apparatus for translating an article and/or an article carrying container between a support member and a work station and which article handling apparatus includes safety means for stopping translation of the article carrying container to avoid injury to the operator.

Still another object is to provide novel handling apparatus for translating in an effective manner an article and/or an article carrying container between a support member and a work station and which article handling apparatus includes safety means operative in response to unwanted obstructions.

The present invention contemplates improved article storage apparatus having a novel extractor assembly for withdrawing and restoring one or more articles or article carrying containers from support means. In one embodiment the novel assembly is adapted for use with a mechanized file unit wherein a plurality of carriers having article carrying containers stored thereon are mounted on a conveyor for conveyance along a path of travel past an access opening in the file unit. Means are provided for operatively positioning any selected carrier adjacent the opening and the extractor assembly is adapted to then translate at least one of the article carrying containers between the selected carrier and a work station at which an operator has access to the contents of the containers so withdrawn. The improved apparatus includes an extractor assembly having novel means associated therewith to retain the containers, during withdrawal and restoration thereof, at a desirable attitude to prevent objectionable noise and/or shifting of the intransit container with respect to the extractor assembly, regardless of the varying position of the selected carrier in the access opening resulting from normal conveyor tolerances.

The improved apparatus further includes safety means for sensing the presence of obstructions in the path of the extractor assembly. The sensing means is coupled to switching means for deactivating the drive for the extractor assembly until the obstruction is removed. Upon reactivation of the extractor assembly drive, normal translation is resumed and the retaining means continues to assure a desirable container attitude without necessitating a recycling of the operative controls. As will be described in further detail hereinbelow, the novel retaining means supportingly engages the associated containers, regardless of interim operation of the safety means, unitl the return excursion of the container is substantially completed. Thus, when the selected container is in its totally withdrawn position enabling operator access to the contents thereof, the container will not become decoupled from the extractor assembly.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood however, that the drawings are for illustrative purposes only and are not to be construed as defining the limits of the invention.

In the drawings wherein like reference characters refer to like parts throughout the several views:

FIG. 1 is a perspective view of a mechanized file unit in which the novel extractor assembly of the present invention may be readily employed.

FIG. 2 is an enlarged front fragmentary perspective view of the file unit shown in FIG. 1 with a side wall of the file unit removed to diagrammatically show the conveyor system.

FIG. 3 is a rear perspective view of the novel extractor assembly of the present invention.

FIG. 4 is a partial plan view of the novel extractor assembly showing a retainer element in detail.

FIG. 5 is an elevational view of the retainer element shown in FIG. 4.

FIG. 6 is a sectional side elevational view of the novel extractor assembly illustrating its coupled relationship with the face portion of a selected container in two possible positions, one of which positions shows the container in phantom outline.

FIG. 7 is a fragmentary front perspective showing the novel extractor assembly and its relationship with the face portion of a selected container.

Figure 8:
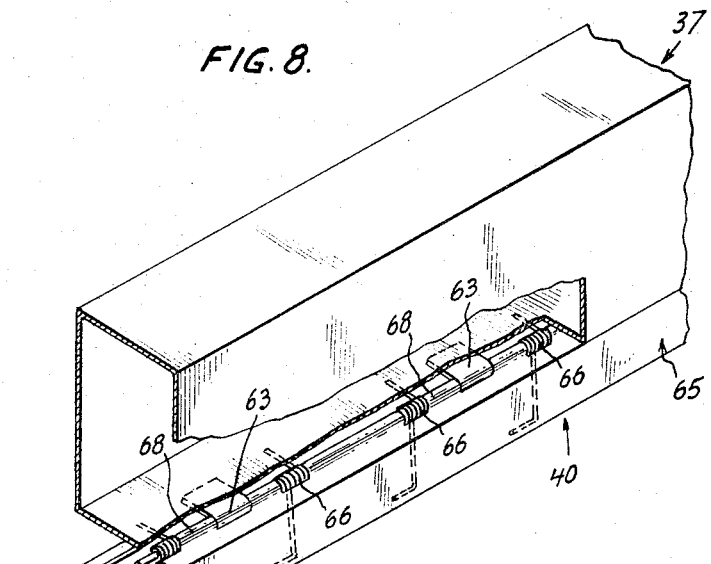
FIG. 8 is a fragmentary perspective of a portion of the extractor assembly and shows the elements of the obstruction sensing safety means in detail.

Referring now to the drawings for a more detailed description of the present invention, and more particularly to FIGS. 1 and 2 wherein a cabinet type conveyor file unit, generally indicated by the reference numeral 20, is shown. FIG. 1 shows unit 20, comprising top portion 21, side portion 22 and front portion 23 in which a posting position 24 is disposed. The posting position is shown in further detail in FIG. 2 wherein a conveyor assembly 25 is partially shown in a diagrammatic manner to establish the environment in which the present invention was conceived. Prior to discussing FIGS. 1 and 2 in further detail it should be pointed out that a file unit such as the unit 20, depicted in FIGS. 1 and 2, is completely described in U.S. Patent No. 3,235,319, issued Feb. 15, 1966 and entitled "Article Storage Equipment." Moreover, a similar cabinet type conveyor file unit is described in U.S. Patent No. 3,236,577, issued Feb. 22, 1966, and entitled, "Article Carrying Conveyor Driven Equipment." In the first mentioned patent an automatic tray extraction feature is described which is the type mechanism with which the present invention is contemplated for operation.

As described in the aforementioned patents, convenient control panels 26 or 27 are employed to selectively position card trays 28 in an access opening 30 adjacent the posting position 24 in front portion 23 of unit 20. The trays 28 are supported in side-by-side relationship on a plurality of carriers 31 (FIG. 2) housed in file unit 20. Carriers 31, as shown diagrammatically in FIG. 2, are suspended from an endless conveyor 25 by carrier arms 31″ connected at one end to a carrier and at the other end the conveyor 25. Carriers 31 are moved either up or down in a well known manner whereupon a selected carrier is positioned at the work station in access opening 30 adjacent a posting table 32 extending outwardly from unit 20. The conveyor drive mechanism includes a sprocket-chain driving reversible motor 33, diagrammatically shown at the lower right of file unit 20 in FIG. 2. Motor 33 is selectively operable through control circuitry 34 integrated with manual keyboard input means of control panels 26 and 27. A control operation of this nature is described in detail in U.S. Patent No. 3,105,727 issued Oct. 1, 1963, and entitled, "Mechanized Cabinet Type File." In a typical operation, control circuit means 34 and commutator 35 is governed by use of keyboard selections on control panel 27 which keyboard is provided with carrier selector push buttons having numerals thereon corresponding to numbers assigned to carriers 31.

It will be readily apparent that by employing an automatic tray extractor assembly as described in Patent No. 3,235,319 a selected card tray 36 can be automatically withdrawn and restored at posting position 24 by the operator. The assignment of card tray position numbers corresponding to numbers on push buttons in control panel 26 will serve this end. A tray extraction mechanism is described in the above mentioned patent relating to such an assembly, therefore, the details are not shown herein and only a brief explanation thereof follows. The extractor mechanism consists of a bank of electromagnets (not shown) mounted on extractor bar 37 and moved horizontally by a continuous chain type drive (not shown). The electromagnets are selectively energized in accordance with the input command by the operator at the control panel 26. Control panels 26 and 27 can be used interchangeably for this and other functions without affecting the scope of the present invention. When the selected magnet engages the face portion of a particular tray disposed adjacent the access opening 30, reversal of the chain drive results in the extraction of the selected tray. Restoration of a withdrawn tray is carried out in the opposite manner following completion of the operator's work at the posting position with respect to the contents of the tray.

In FIG. 2 tray 36 is illustrated in the fully withdrawn posting position. The extractor bar 37 is at rest in its outermost position. The present invention contemplates the incorporation of novel features in the extractor assembly to facilitate and improve the operation thereof and to render the overall filing apparatus safer and more reliable, and to provide smoother operating characteristics. To achieve these ends the extraction mechanism is provided with a plurality of retaining elements 38 secured to the rear surface of extractor bar 37, and a safety bar assembly 40 secured to the bottom surface of extractor bar 37. Electromagnet assembly 41, forming part of the horizontally translatable portion of the extractor assembly is also secured to the bottom surface portion of extractor bar 37 and extends rearwardly to provide a horizontally disposed shelf-like surface 42, upon which a plurality of pads 43 are secured. One pad 43 is disposed adjacent each retaining element 38 in the manner shown; however, one continuous pad along the entire surface would also be adequate. Horizontally spaced housing members 44 and 45 are provided to enclose the extractor assembly drive mechanism (not shown) and to present conveniently located work surfaces. Posting table 32 also provides housing for portions of the extractor assembly and as such, presents a recessed surface extending between housing members 44 and 45, along which surface extractor bar 37 reciprocally traverses during translation to and from the posting position.

Each retaining element 38 is disposed opposite a corresponding card tray position on the selected carrier positioned in access opening 30. Each carrier has a like number of side-by-side card tray positions and when a carrier is stopped adjacent the access opening a similar number of card tray positions are represented, regardless of the particular carrier selected. Likewise, each tray position and corresponding retaining element 38 has an associated electromagnet to couple the selected tray to the extractor assembly, as illustrated in FIG. 2 wherein a selected tray 36 has been withdrawn to the posting position. Now referring to the particular structure of an individual retaining element, a spring member 46 is secured to the extractor bar 37 near surface portion 47. Extending substantially perpendicularly therefrom is integral ramp member 48 having a notched or stepped upper edge 50 and a serrated lower edge 51. Disposed on the upper surface 42 of magnet assembly 41 in close adjacency to the serrated edges 51 are pads 43 constructed from rubber or similar resilient plastic material.

The details of an exemplary retaining element are shown in FIGS. 4 and 5 wherein plan and elevational views are respectively set forth. Holding means 52, such as rivets or the like are utilized to secure spring member 46 to surface portion 47 of extractor bar 37. Resiliency of spring member 46 may be further enhanced by providing an optional cut-away slot portion 53 as shown in FIG. 5. Extending ramp member 48, which is preferably integral but may be a separate detachable part, is disposed with projecting serrations 51 in relatively close adjacency to the upper surface of pad 43. Thus, the rest position of retaining element 38 is such that spring member 46 is biased against a stop 54 in the form of a stud or the like projecting from pad 43 to engage the outer surface of spring member 46 along the bottom edge thereof. During operation, the retaining element is capable of flexing to extreme position 55 (shown in phantom outline in FIG. 4). When a downward force is applied, retaining element 38 is maintained in its flexed position as a result of the serrations 51 engaging pad 43 as set forth in the operational description hereinbelow. A slight twisting of the spring member 46 takes place to effect the latter mentioned engagement between pad 43 and serrated edge 51.

The electromagnet assembly 41 shown in FIG. 3 comprises inner and outer plate members 56 and 57, respectively, and an intermediate energizable core portion 58. Poles are established through flux eminating from selected coils disposed in the vicinity of each corresponding tray as discussed above and as described in U.S. Patent No. 3,235,319, identified above. A coil 60 is shown in FIG. 6 to illustrate the relationship of the extractor mechanism and a selected tray 36'. In the solid line representation of FIG. 6 the pole surfaces of plate members 56 and 57 have engaged a magnetizable portion on the face of tray 36', and the associated tray pull 61, including a downwardly extending flange portion 62, has registered with the lowermost notch in edge 50 of ramp member 48. This of course is the lower limit at which the improved extractor assembly will operate, i.e., the last notch is utilized for registration with tray pull 61 and retaining element 38 has been flexed against surface 48 of extractor bar 37. The several other notches disposed in the upper edge of ramp member 48 are adequate to accommodate tray pull 61 within a range of possible rest positions of the associated carrier (not shown). As discussed above, the carrier conveyor operation is of a nature such that the exact carrier stopping position cannot be determined accurately. To this end an intermediate rest position of tray 36' is represented in phantom outline 36" (FIG. 6) to illustrate the relative flexed position of ramp member 48" when tray pull 61" engages the notch corresponding to the vertical disposition of tray 36" in such instance. The FIG. 7 perspective view clearly shows the relationship of drawer pull 61 ramp member 48 and pad 43 after electromagnetic coupling has effectively coupled tray 36' in an intermediate position within the known range of possible carrier rest positions.

The obstruction sensing safety bar assembly 40 shown in FIGS. 1, 6 and 7 is depicted in further detail in FIG. 8 and comprises sheet metal hinge elements 63, a mounting rod 64, a four-sided channel member 65, torsion springs 66 and one or more switch assemblies 67. Hinge elements 63 are secured to the under side of extractor bar 37, and torsion springs 66 are disposed equidistantly along mounting rod 64, which is secured to extending arcuate tabs 68 projecting from the edge of channel member 65. The main body portion of channel member 65 is thereby biased in the position shown in FIG. 6 by springs 66 and is disposed for pivotal operation in response to a force transmitted to any of the three outer surfaces 70, 71 or 72, e.g., an obstruction in the path of surface 71 during a withdrawing operation of extractor bar 37. Rotation of channel member 65 to the position illustrated in phantom outline in FIG. 6 causes a switch button 73 projecting from switch assembly 67 to contact the bottom surface of magnet plate 56. The switch button closes electrical contacts in a well known manner resulting in shut down of the drive means (not shown) for the extractor assembly and thus preventing subsequent operation until safety channel member 65 is permitted to return to its normally biased position. In a device of this nature the switch contacts normally interrupt power to the entire unit resulting in deenergization of the electromagnet being utilized in the extraction operation; however, regardless of such decoupling the retaining means will serve to physically secure the tray being extracted until recoupling is effected by a reset operation.

To facilitate understanding of the operation of the above described invention, assume that it is desired to use the extractor assembly including extractor bar 37, retaining elements 48 and safety mechanism 40, as a unit independently of the operation of the conveyor 25 of the file unit 20. Under such conditions a selected carrier has been selected and is at rest adjacent access opening 30, and a plurality of trays 28 are disposed thereon in a side-by-side relationship. Reciprocal motion of extractor bar assembly 37 is controlled by push buttons on control panel 26 (or 27) and individual card tray selection is likewise controlled by push buttons on control panels 26 and 27. The controls for the conveyor and card tray selection are fully described in U.S. Patent No. 3,235,-

Figure 9:
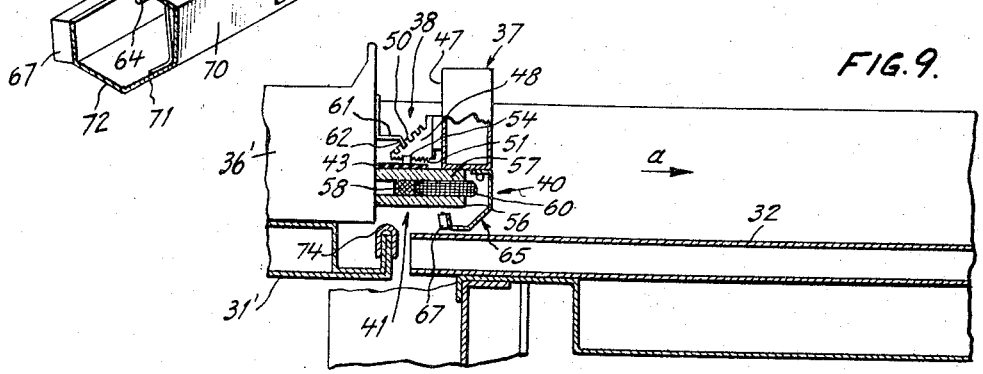
FIG. 9 is a partial side elevation showing the extractor assembly and an associated selected container in the initial retracting position.

319. To fully withdraw a selected tray 36 to the posting position shown in FIG. 2, the extractor assembly is translated inwardly to the position shown in FIG. 9, whereupon the pole faces of electromagnet assembly 41 engage the magnetizable face surface of tray 36'. Just prior to such contact the electromagnet corresponding to the selected tray position is energized to provide coupling. Simultaneously with the tray face engagement, the tray pull outer flange 62 registers with notched ramp edge 50, causing the retaining element to flex away from stop 54 a distance corresponding to the particular vertical position of engagement of the tray pull and ramp member 48. For example, a minimum flexure takes place when carrier 31' comes to rest at its uppermost position and tray pull 61 registers with the uppermost notch in the notched edge of ramp member 48. On the other hand, if the selected carrier comes to rest at its lowest possible position, retaining element 38 is caused to flex to its greatest possible distance away from stop 54 as a result of tray pull 61 engaging the lowermost notch.

Upon initiation of the withdrawal operation of tray 36' by motion of extractor bar 37 in direction $a$ (FIG. 9) the lower surface of the tray slidably engages an outer lip portion 74 of carrier 31'. Withdrawal of tray 36' continues in this manner until the tray reaches its respective posting position illustrated in FIG. 10. It should be noted that in its outermost position, tray 36' assumes a slightly tilting attitude, i.e., the outer portion of the tray is in closer proximity to posting table 32 than the inner portion which remains supportingly engaged on lip portion 74. The tilt of the tray is substantially the same regardless of the rest position of the selected carrier which changes with respect to the fixed position of the extractor assembly.

Figure 10:
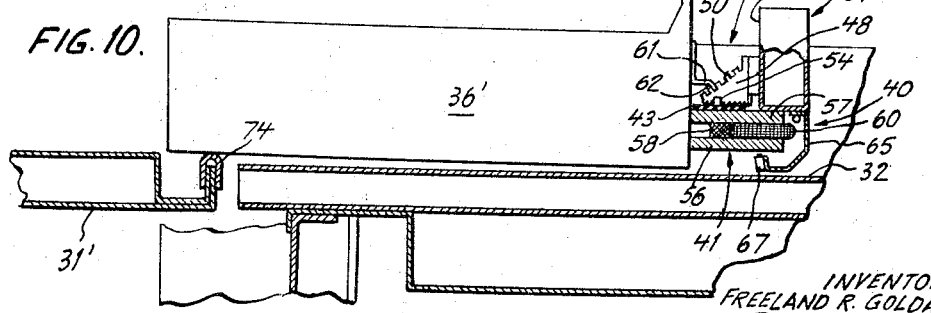
FIG. 10 shows the extractor assembly and container of FIG. 9 in a posting position.

A critical point in this withdrawal operation occurs at the instant the center of gravity of the tray passes lip 74. The tray then slides vertically along the face of the electromagnet and the pull then transmits the weight of the tray to retaining member 38 which in turn twists and serrated edge 51 engages pad 43 (FIG. 10). The tilt of the tray is minimal and is determined by the fixed spacing between edge 51 and pad 43 (shown most clearly in FIG. 6). This minimal shifting obviates objectionable noise and abrupt jarring of the tray and the contents thereof and thereby pad 43 in effect cushions the tray in a manner precluding any deleterious effects.

An addition feature of the extraction mechanism described above is safety mechanism 40 which prevents operation of extractor bar 37 when obstructions are disposed in the path thereof. In automatic apparatus of the nature described the operator may inadvertently lay a book or rest one arm on the posting table during the course of an extraction operation. By contact of such obstruction with channel member 65 a pivotal action (described above) away from its normally biased disposition causing depression of switch button 73 and resulting shut down of the extractor drive mechanism. During such shut down, retaining element 38 retains the extractor assembly in operative contact with the selected tray for normal resumption of the withdrawal function when reset of the operative mechanism is effected.

It should be further noted, that during normal operation the selected electromagnet is deenergized when the tray reaches the posting position (see FIG. 2). Thus a further advantage of the present invention is the capability of retaining element 38 to continually engage the tray pull of the selected tray during normal posting, whereby separation of the tray face portion of the electromagnet pole face is obviated thus prevented an abrupt collision between the extractor assembly and the withdrawn tray when restoration of such tray is initiated. During such restoration the tray is replaced on the carrier in the inverse manner from which it was removed, i.e., the center of gravity of the tray and contents passes lip 74, the tray tilts away from ramp member 48, serrated edge 51 disengages pad 43 and finally the extractor assembly is withdrawn from the tray removing tray pull flange portion from notched edge 50.

Many advantages of the present invention have been explicitly and implicitly set forth throughout the above description of a preferred embodiment thereof. Although such specific embodiment of the invention has been illustrated in detail by way of example, it is to be understood that the invention and other associated advantages are not limited thereto. Various changes may be made in the design and arrangement of parts without departing from the spirit and scope of the invention as defined by the appended claims, as will now be understood by those skilled in the art.

What is claimed is:
1. Article storage apparatus comprising,
  (a) a housing having an access opening therein,
  (b) conveying means disposed in said housing,
  (c) said conveying means having a plurality of carriers arranged for conveyance along a path of travel past said access opening,
  (d) means extending outwardly from said housing adjacent said access opening,
  (e) one or more article carrying containers disposed on each carrier,
  (f) means for operatively positioning a selected carrier adjacent said access opening, and
  (g) means for translating at least one of said article carrying containers between said selected carrier at said access opening and a work station in the vicinity of said extending means,
  (h) means associated with said translating means for retaining said one container at a desirable attitude during translation thereof between said selected carrier and said work station, said retaining means operatively connecting said one container and said translating means when said container reaches an intermediate position during translation thereof from the carrier to said work station.

2. Article storage apparatus as set forth in claim 1 wherein each container includes a face portion and said translating means comprising an extractor assembly including selectively operable coupling means aligned with each of said face portions under conditions where said containers are positioned at said access opening, said coupling means including activating means for effecting coupling between the extractor assembly and said one container during alignment therebetween.

3. Article storage apparatus as set forth in claim 2 including means for reciprocally driving said extractor assembly between inner and outer limits for selectively extracting and restoring the containers, said limits defined respectively by the containers positioned on said selected carrier adjacent said access opening and by said work station, means for deactivating said activating means when said selected coupled container is positioned at said work station, and wherein said retaining means are mounted on said extractor assembly and are adapted to provide vertical support for said container upon arrival thereof at said intermediate position, whereby said retaining means and container remain supportingly engaged until said drive means returns said extractor assembly to said intermediate position during restoration of said container to said selected carrier.

4. Article storage apparatus as set forth in claim 1 wherein each container includes an integral flange portion extending downwardly from an outer surface portion exposed in the access opening when said selected carrier is positioned adjacent thereto, said translating means includes an extractor assembly extending transversely of said access opening and adapted for reciprocal motion with respect thereto, and said retaining means comprise one or more ramp members resiliently mounted and extending outwardly from said extractor assembly in alignment with corresponding flange portions, each ramp member including a notched edge portion facing upwardly for registration with the outer edge of the corresponding flange portion under conditions where said extractor assembly has been translated inwardly with respect to said access opening.

5. Article storage apparatus as set forth in claim 4 wherein each ramp member includes a serrated edge portion adapted to engage said extractor assembly to couple said container to said translating means under conditions where said extractor assembly is moved outwardly from said access opening toward said work stattion and said translating means thereby passes through said intermediate position.

6. Article storage apparatus as set forth in claim 1 wherein said container includes a portion formed of magnetizable material, and said translating means include an extractor assembly having selectively energizable electromagnetic means aligned with said magnetizable portion under conditions where said container is positioned at said access opening, said electromagnetic means being adapted to effect coupling between the extractor assembly and said container during alignment therebetween.

7. Article storage apparatus as set forth in claim 6 including means for reciprocally driving said extractor assembly between inner and outer limits for selectively extracting and restoring the containers, said limits defined respectively by the containers positioned on said selected carrier adjacent said access opening and by said work station, means for deactuating said electromagnetic means when said selected coupled container is positioned at said work station, and wherein said retaining means are mounted on said extractor assembly and are adapted to support said container upon arrival thereof at said intermediate position, whereby said retaining means remain supportingly engaged until said drive means returns said extractor assembly to said intermediate position during restoration of said container to said selected carrier.

8. Article storage apparatus as set forth in claim 6 wherein said translating means include means for sensing the presence of obstructions in the path of said extractor assembly, and means coupled to said sensing means for preventing further translation of said container under conditions where an obstruction remains in said path.

9. Article storage apparatus as set forth in claim 6 wherein said translating means includes an extractor assembly extending transversely of said access opening, means for reciprocally driving said extractor assembly between inner and outer limits for selectively extracting and restoring said containers, electromagnetic coupling means aligned with each container disposition, and means for selectively actuating said electromagnetic coupling means for effecting extraction of said containers, said extractor assembly further including a bar extending transversely of said access opening and in close adjacency with said extending means during said reciprocal drive of said translating means, means for pivotally mounting said bar for axial rotation thereof when an obstruction is disposed in the path of said bar along said extending means, and switch means associated with said bar for deactivating said drive means under conditions where said bar has been rotated through a predetermined angle.

10. In article storage apparatus including a housing having an access opening provided in one side thereof, a conveyor in said housing, a plurality of carriers mounted in spaced relationship on said conveyor, a plurality of article carrying containers disposed on said carriers in predetermined positions, conveyor control means operable for controlling operation of said conveyor and effectively controlling the selective positioning of the carriers at said access opening, container translating means including an extractor assembly extending across the width of said access opening, said extractor assembly including like coupling means associated with each of said predetermined positions on said carriers, means for selectively operating said coupling means whereby one or more containers disposed adjacent thereto are successively withdrawn from the associated carrier to an adjacent work area and restored to the associated carrier from the work area, the improvement comprising,
 (a) means for retaining the selected container at a desirable attitude during translation thereof,
 (b) said retaining means including a like plurality of ramp members having a notched edge portion, and
 (c) means for resiliently securing said ramp members to said extraction assembly with said notched edge portion extending outwardly and upwardly and in alignment with a corresponding container position in said access opening,
 (d) said retaining means adapted to support said coupled container by engaging the forwardmost edge thereof during withdrawal of said one or more containers from said associated carrier.

11. Article storage apparatus as set forth in claim 10 wherein each of said ramp members includes a serrated edge portion, said securing means includes a spring member extending between each of said ramp members and said extraction assembly and at least one pad member supported in close adjacency to said ramp members, said notched edge portion adapted to engage the container adjacent thereto resulting in a force flexing the spring downwardly causing fixed engagement between the serrated edge of the ramp member and the adjacent surface of said pad member.

References Cited
UNITED STATES PATENTS

| 2,745,706 | 5/1956  | Mendelsohn     | 312—223 X |
| 3,105,727 | 10/1963 | Anders         | 312—223   |
| 3,235,319 | 2/1966  | Anders et al.  | 312—223   |
| 3,236,577 | 2/1966  | Ander et al.   | 312—223   |
| 3,297,378 | 1/1967  | Krug et al.    | 312—223   |
| 3,297,379 | 1/1967  | Artaud et al.  | 312—223   |
| 3,298,766 | 1/1967  | Graber et al.  | 312—223   |
| 3,306,691 | 2/1967  | Graber et al.  | 312—223   |

CASMIR A. NUNBERG, *Primary Examiner.*